(12) United States Patent
Hiner et al.

(10) Patent No.: US 8,182,587 B2
(45) Date of Patent: *May 22, 2012

(54) FILTRATION SYSTEM FOR GAS TURBINES

(75) Inventors: Stephen David Hiner, Salisbury (GB); Rahul Jaikaran Chillar, Marietta, GA (US); Bradly Aaron Kippel, Greer, SC (US); Lisa Kamdar Ammann, Simpsonville, SC (US); Jack Thomas Clements, Lee's Summit, MI (US); Marcus Carr Walters, Ash Green (GB); Sebastien Cloarec, Essert (FR); Marc Malivernay, Valdoie (FR); Liberto Gandia, Brevilliers (FR)

(73) Assignee: General Electric Company, Schenectady, NY (US)

( * ) Notice: Subject to any disclaimer, the term of this patent is extended or adjusted under 35 U.S.C. 154(b) by 767 days.

This patent is subject to a terminal disclaimer.

(21) Appl. No.: 12/200,087

(22) Filed: Aug. 28, 2008

(65) Prior Publication Data
US 2010/0054919 A1 Mar. 4, 2010

(51) Int. Cl.
*B01D 46/00* (2006.01)

(52) U.S. Cl. ............... 95/268; 55/320; 55/327; 55/482; 55/485; 95/287

(58) Field of Classification Search .............. 95/268, 95/287, 273; 55/302, 306, 324, 327, 332, 55/350.1, 497, 501, 521, 528, 482, 485, 428, 55/495, 511, 462, DIG. 17, DIG. 18; 96/108, 96/396
See application file for complete search history.

(56) References Cited

U.S. PATENT DOCUMENTS

| | | | | |
|---|---|---|---|---|
| 4,234,323 A * | 11/1980 | Maher | ............................. | 95/278 |
| 4,926,620 A * | 5/1990 | Donle | ............................. | 95/202 |
| 6,123,751 A * | 9/2000 | Nelson et al. | .................... | 95/268 |
| 6,260,658 B1 * | 7/2001 | Darrell et al. | ................... | 181/224 |
| 6,368,386 B1 * | 4/2002 | Nelson et al. | .................... | 95/268 |
| 6,540,805 B2 * | 4/2003 | Ohno et al. | ..................... | 55/486 |
| 6,602,328 B2 * | 8/2003 | Doi et al. | ........................ | 95/278 |
| 6,766,636 B2 * | 7/2004 | Shingu et al. | ............... | 60/39.092 |
| 6,833,022 B2 * | 12/2004 | Feisthammel et al. | ............ | 95/91 |
| 6,966,939 B2 * | 11/2005 | Rammig et al. | ................ | 55/486 |
| 7,340,902 B2 * | 3/2008 | Jimenez Haertel et al. | .... | 60/775 |
| 7,520,137 B2 * | 4/2009 | Hoffmann et al. | .............. | 60/775 |
| 7,527,674 B1 * | 5/2009 | Janawitz et al. | .................. | 96/57 |

(Continued)

OTHER PUBLICATIONS http://www.donaldson.com/en/gasturbine/selfcleaning/index.html; Aug. 28, 2008; "Self Cleaning Air Filters", pp. 1-2.

(Continued)

*Primary Examiner* — Duane Smith
*Assistant Examiner* — Minh-Chau Pham
(74) *Attorney, Agent, or Firm* — Cantor Colburn LLP

(57) ABSTRACT

A system for use with an inlet of a gas turbine through which an airflow toward the gas turbine proceeds is provided and includes a first self-cleaning stage to remove dust, snow and ice from the airflow, a second water tight stage, disposed downstream from the first stage, to prevent aerosol droplets and aqueous solutions of deliquesced particulates, which include at least portions of the dust not removed by the first stage and which are re-released into the airflow from the first stage, from proceeding along the airflow and to remove solid particulates not removed by the first stage from the airflow, and a third water removal stage, disposed downstream from the second stage, to remove from the airflow aerosol droplets leaking from the second stage.

16 Claims, 2 Drawing Sheets

U.S. PATENT DOCUMENTS

| | | | |
|---|---|---|---|
| 7,632,339 B2 * | 12/2009 | Singh | 95/273 |
| 7,648,564 B2 * | 1/2010 | Chillar et al. | 95/273 |
| 7,695,551 B2 * | 4/2010 | Janawitz et al. | 96/66 |
| 7,712,301 B1 * | 5/2010 | Wagner | 60/39.53 |
| 7,832,192 B2 * | 11/2010 | Jimenez Haertel et al. | 60/39.3 |
| 7,846,230 B2 * | 12/2010 | Mei et al. | 55/525 |
| 2003/0010210 A1 * | 1/2003 | Kawano et al. | 95/287 |
| 2003/0084788 A1 * | 5/2003 | Fraser, Jr. | 95/285 |

OTHER PUBLICATIONS

Stephen David Hiner et al.; "Filtration System for Gas Turbines"; filed Aug. 28, 2008; pp. 1-15.

* cited by examiner

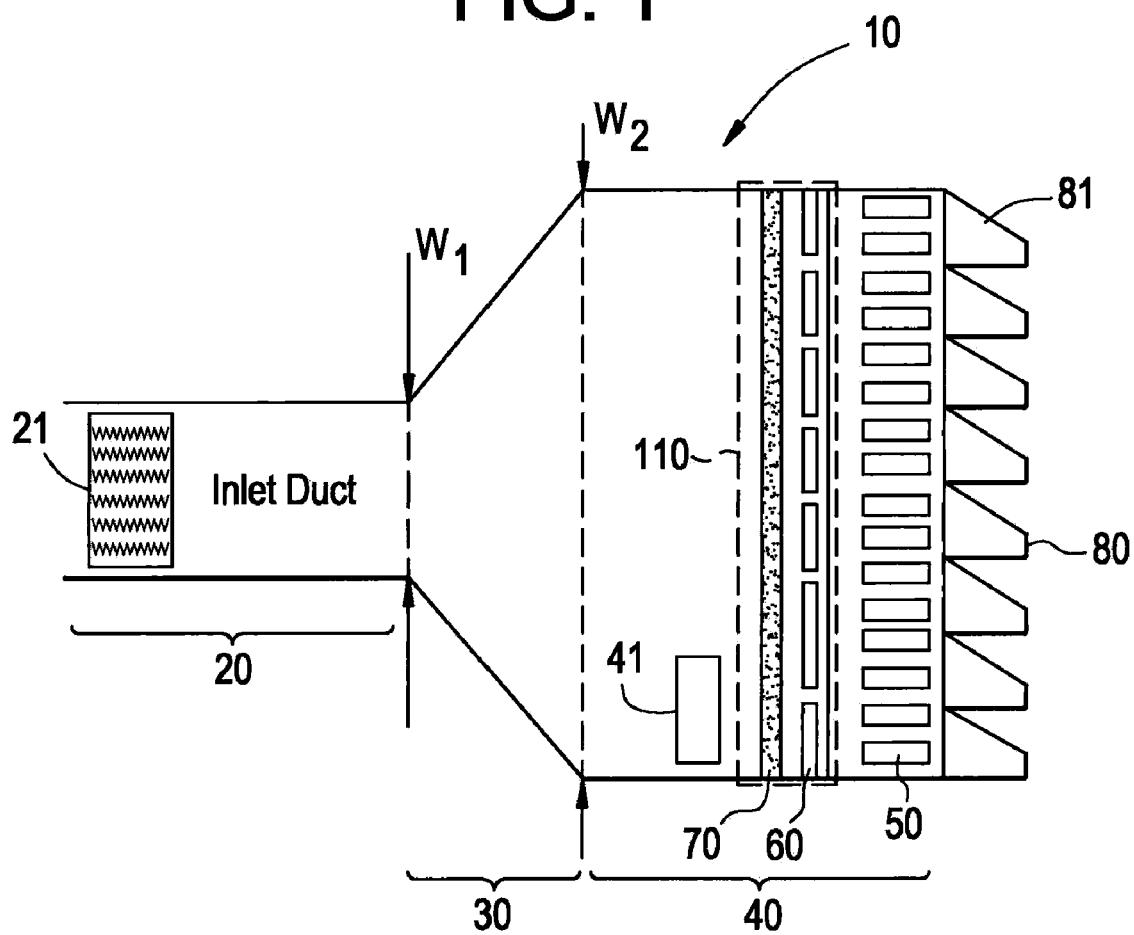

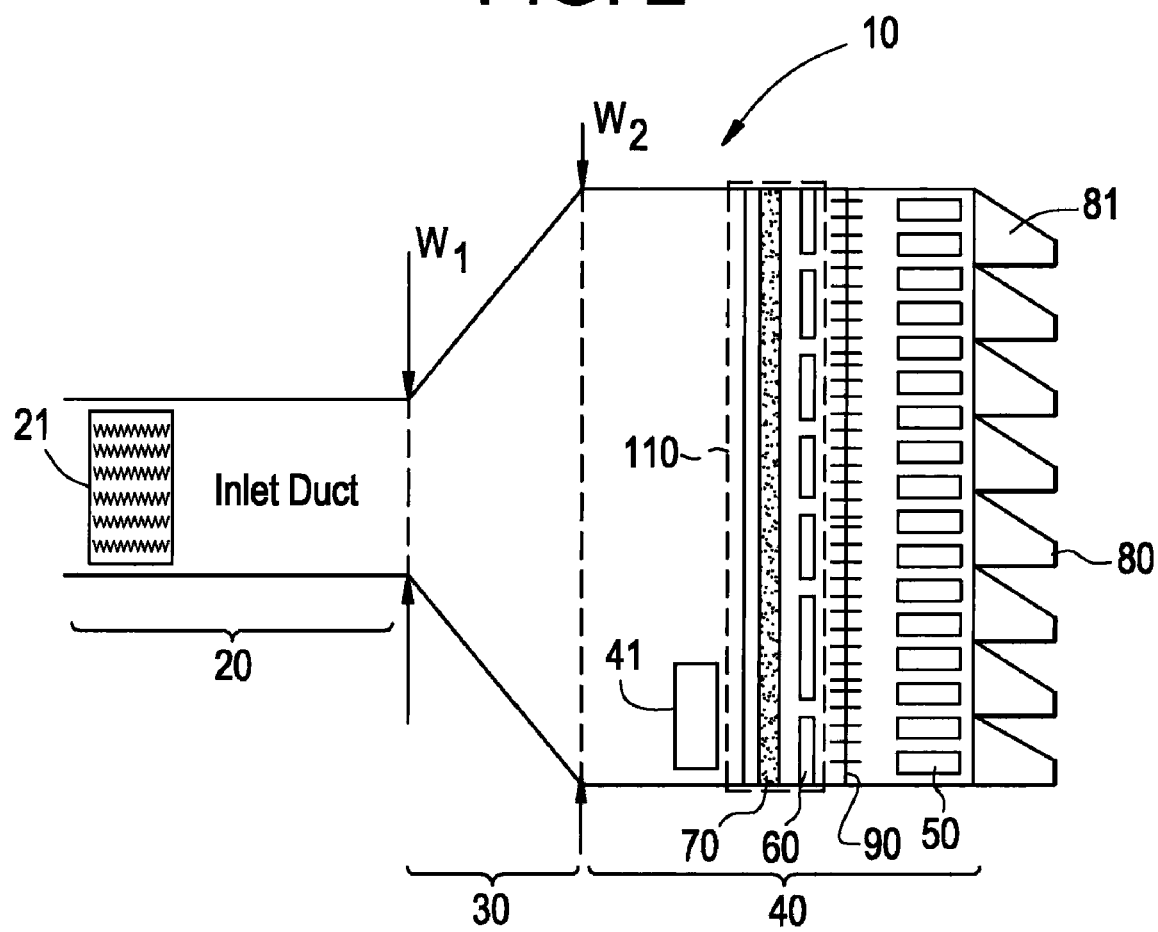

FILTRATION SYSTEM FOR GAS TURBINES

BACKGROUND

Inlet air filtration systems are generally employed for use with gas turbines and operate by removing salt, dust, corrosives and water (hereinafter referred to as "corrosives") from inlet air in order to prevent their entry into the gas turbine. Corrosives can enter the gas turbines in various forms, such as solids (i.e., dry salt) or aqueous solutions (i.e., wet salt), and corrode the gas turbine elements. This corrosion could lead to operational failures and financial losses. As such, it is typically necessary to provide for corrosion mitigation to the gas turbine engine by way of an inlet filtration system that reduces the amount of corrosives entering the gas turbine.

The corrosives can exist in several states which can enter the gas turbine. One state includes Solid Particulate Corrosive elements. These include salt and oxide particles which can be removed by high efficiency filters. A second state includes Liquid, or, rather, Aqueous Corrosives elements. These include aqueous chlorides or acids, the removal of which cannot generally be efficiently accomplished by particulate filters.

In both cases, the corrosives can be moved along airflow by, typically, two main transfer mechanisms. These mechanisms include situations in which solid salts are deposited on particulate filters that can deliquesce when the humidity of ambient air rises beyond about 60% relative humidity (RH). The mechanisms may also include situations in which the filter elements themselves get wet and salts, which are in dissolved states via sea aerosol, rain, fog, mist and snow and other sources of water, enter the inlet air stream. Once salt solutions pass the final filters, there is a potential also for the liquid to dry and for salt to precipitate out of solution. This salt precipitate or crystallized salt can now enter the gas turbine, in addition to the liquid itself.

Current filtration systems available on the market specifically for salt and water removal are generally classified into 3-stage systems and barrier-type systems. The 3-stage systems include a first vane/moisture separator, as a first stage, coalescing filters, as a second stage, and a second vane separator as a third stage. The coalescing filter captures small salt aerosol droplets and causes them to coalesce into larger droplets and which can then be drained off as salt water. The coalescing filter also removes dust and dry salt particles from the inlet air which may be less than 1 micron in diameter and hydroscopic. The third stage removes any remaining droplets from the airstream, such as droplets that form from dry salt particles filtered by the coalescing filter, which take on water from humid inlet air and which are re-released into the airstream.

In a relatively dry environment in which the 3-stage system is used, a vane separator can be used as final stage, and dry salt particles may accumulate on the rear of the coalescing filter, due to successive periods of deliquescence. These dry salt particles can then be re-released into the airstream as fine particles which will not be removed by the second vane separator which can lead to salt accumulation on the gas turbine elements.

In the barrier-type systems, which are similar to two-stage static filter systems except that the final stage of the typical barrier-type system is a watertight high efficiency filter, the filter element is watertight and allows air, but not water, to pass through. They also do not include a second vane separator. In practice, barrier-type systems rely on a 100% seal against water being allowed to proceed downstream of the filter. This 100% seal is achievable on new and clean filtration systems but requires maintenance for proper operation. Therefore, while the barrier-type system media can be effective at stopping the migration of salt toward the gas turbine elements, the primary failure mode is seen as being the sealing mechanism if the maintenance or installation is performed improperly.

BRIEF DESCRIPTION

In accordance with an aspect of this invention, a system for use with an inlet of a gas turbine through which an airflow toward the gas turbine proceeds is provided and includes a first self-cleaning stage to remove dust, snow and ice from the airflow, a second water tight stage, disposed downstream from the first stage, to prevent aerosol droplets and aqueous solutions of deliquesced particulates, which include at least portions of the dust not removed by the first stage and which are re-released into the airflow from the first stage, from proceeding along the airflow and to remove solid particulates not removed by the first stage from the airflow, and a third water removal stage, disposed downstream from the second stage, to remove from the airflow aerosol droplets leaking from the second stage.

In accordance with another aspect of the invention, a method of filtering airflow of inlet air in an inlet housing of a gas turbine is provided and includes removing dust, snow and ice from the airflow at a first stage of the inlet, at a second water tight stage, disposed downstream from the first stage, preventing aerosol droplets and aqueous solutions of deliquesced particulates, which include at least portions of the dust not removed by the first stage and which are re-released into the airflow from the first stage, from proceeding along the airflow and removing solid particulates not removed by the first stage from the airflow, and, at a third water removal stage, disposed downstream from the second stage, removing from the airflow aerosol droplets leaking from the second stage.

BRIEF DESCRIPTION OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a side sectional view of a system for an inlet through which airflow is defined according to an embodiment of the invention; and FIG. 2 is a side sectional view of a system for an inlet through which airflow is defined according to another embodiment of the invention.

DETAILED DESCRIPTION

With reference to FIG. 1, a system 10 for an inlet of, e.g., a gas turbine, is provided. Here the gas turbine may have an approximate air flow range of about 50 Lb/sec to about 2000 Lb/sec in which airflow A proceeds toward the gas turbine at a range of approximate velocities of about 300 ft/min (91 meters/min) to about 3,000 ft/min (914 meters/min). The inlet includes an inlet duct 20 along which the airflow A travels toward elements of the gas turbine, such as the turbine, the compressor and the combustor, to provide for a supply of coolant and combustible air to the gas turbine which is significantly free of solid particles (i.e., dry particles) and aqueous solutions that could lead to an accumulation of corrosive deposits on those elements. A silencer section 21 is disposed within the inlet duct 20 to dampen noise generated within the gas turbine.

The inlet further includes a filter house module 40 and a transition duct 30 disposed between the inlet duct 20 and the filter house module 40. The transition duct 30 has a width W1 where it is fluidly coupled to the inlet duct 20 and a width W2, which may be wider than width W1, where it is fluidly coupled to the filter house module 40.

The filter house module 40 can be embodied as a duct or, more generally, as a duct housing that is fluidly coupled to the transition duct 30 and which serves as an end of the inlet of the system 10. As such, the airflow A initially passes through the filter house module 40 on its way toward the gas turbine elements. The filter house module 40 may be serviced by an operator via access point 41. As shown in FIG. 1, the filter house module 40 further supports at least the first stage 50, the second stage 60 and third stage 70 of the system 10.

The first stage 50 of the system 10 may include a self cleaning filter. The self cleaning filter may be a cylindrical filter primarily designed for high dust and/or high snow environments and operates by rejecting dust and/or snow that accumulates on the filter with a pulse of compressed air. In cold environments, this pulse of compressed air can be directed and made sufficiently powerful to blow ice formed on filters.

The second stage 70 of the system 10 may include a water tight filter, disposed downstream from the first stage 50, that prevents liquids and/or aqueous solutions of deliquesced dry particles that have been re-released into the airflow A from the first stage from proceeding along the airflow A and which also removes dry particles from the airflow A. To this end, the water tight filter of the second stage 60 may be mounted with, e.g., an oblique angle with respect to a direction of the airflow A, such that a tip thereof points toward the on-coming airflow A. With this configuration, any water or liquid captured by the filter is caused to drain away from the airflow A. Since the second stage 60 is water tight, even if captured particles, such as salt, deliquesce the newly formed resultant aqueous solution cannot proceed downstream past the water tight filter.

In accordance with embodiments, the filtration efficiency of the water tight filter of the second stage 60 is such that it removes both the fine dust particulates that penetrate the first stage 50 and any fine dry salt particulates in the atmosphere from the airflow A.

In accordance with further embodiments, the water tight filter of the second stage 60 may include fiberglass, or some other suitable filtering material, and may have a coating or treatment made from a hydrophobic material, or some other suitable water tight coating or treatment material.

The third stage 70 of the system 10 may include a vane separator or, rather, a moisture eliminator, disposed downstream from the second stage 60, that serves to remove droplets from the airflow A and which is virtually 100% efficient at removing droplets larger than 20 microns from the airflow A. The vane separator of the third stage 70 is included in the system 10 to provide an added level of protection for the gas turbine against liquids and/or aqueous solution leaking from the first and second stages. For example, the third stage 70 protects the gas turbine in case the second stage 60 fails, if seals and/or gaskets of the second stage 60 fail and/or in a case of an incorrect installation of the second stage 60.

The system 10 may further include a drainage system 110 for use with at least the second and third stages 60 and 70. The drainage system 110 allows water to be drained out of the filter house module 40 and away from the second and third stages 60 and 70 while, at the same time, preventing unfiltered air from entering the inlet. In an embodiment, this can be achieved by a loop seal drain or some other suitable system.

The drainage system 110 may include a baffled drainage box that prevents an occurrence of an air bypass through the drainage system 110. Here, in an example, water from the vane separator of the third stage 70 drains into a top and upstream side of the drainage box which includes a feed water connection point and a control valve that controls a flow rate of the feed water. The vane separator water exits from an upper and downstream side of the drainage box. A baffle separates the upstream from downstream side of the drainage box, is attached to the top of the drainage box and extends downwards therein. A gap at the floor of the drainage box allows the feed water to enter into the downstream side. The drainage box may also be equipped with water level instrumentation that allows the drainage box to be filled with the feed water when/if the water level is near a height of the baffle.

Although it is shown in the figures as being in operational communication with the second and third stages 60 and 70, it is noted that embodiments of the drainage system 110 exist that can provide for drainage of the first stage 50, as described above, and or any other stage/filter disposed within the filter house module 40.

In accordance with additional embodiments, the system 10 may further include a weather hood 80, which is disposed upstream from the first stage 50 to provide for protection of at least the gas turbine and the above-discussed features from rain. The weather hood 80 may itself include individual treatments 81 that can be disposed and/or angled to withstand a relatively large portion of the rain in the atmosphere around the system 10.

With reference to FIG. 2, it is noted that the system 10 may further include an anti-icing system 90 that prevents the formation of ice on the filters in cold environments. Such an anti-icing system 90 may include any one or more of a hot water coil, a steam coil or hot compressed air, which is bled from the compressor of the gas turbine.

Where the first through third stages, 50, 60 and 70 are included in the system 10, it is seen that the combinations of the stages provide for additional resistance to sound waves emanating out of the gas turbine. As such, a proportional decrease in a size of the silencer section 21 of the inlet duct 20 is possible. Thus, a corresponding decrease in manufacturing costs is also possible.

In accordance with various embodiments, a spacing between the various stages of the system 10 may be up to, at least, about 30 ft (9.1 meters) to provide for maintenance access and to enable any drops of water to fall onto the walkway of the filter house module 40 and to thereby maximize the water removal efficiency of the system. Of course, it is understood that this spacing is not required and that other configurations are possible.

Although it is not shown in the drawings, it is understood that other configurations besides those which are described above are possible. For example, vane separators may be employed in place of or to replace the weather hood 80 of FIG. 1. Similarly, such vane separators could be employed in addition to the weather hood 80. Here, the anti-icing system 90, of FIG. 2, may be disposed between the vane separators and the weather hood 80.

With reference to FIGS. 1 and 2, in accordance with another aspect of the invention, a method of filtering an airflow of inlet air in an inlet housing of a gas turbine is provided and includes removing dust, snow and ice from the airflow at a first stage of the inlet, at a second water tight stage, disposed downstream from the first stage, preventing aerosol droplets and aqueous solutions of deliquesced particulates, which include at least portions of the dust not removed by the first stage and which are re-released into the airflow from the first stage, from proceeding along the airflow and removing solid particulates not removed by the first stage from the airflow, and, at a third water removal stage, disposed downstream from the second stage, removing from the airflow aerosol droplets leaking from the second stage.

The method may further include angling a weather hood upstream from the first stage to provide for protection from rain and preventing downstream ice formation by an anti-icing system disposed upstream from the first stage.

The system 10 and methods described herein describe a filter system that is capable of removing dust and/or snow and/or ice as well as both dry and wet salts (as well as other corrosive elements), such as, at least, NaCl, sulphates, and/or other chlorides from the airflow A relatively effectively and with a high degree of robustness. As such, the system 10 can be employed for use with gas turbines that are generally land based in coastal locations, inland locations, or locations exposed to high concentrations of corrosive contaminants.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims

The invention claimed is:

1. A system for use with an inlet of a gas turbine through which an airflow toward the gas turbine proceeds, the system comprising:

a first self-cleaning stage to remove dust, snow and ice from the airflow;

a second water tight stage, disposed downstream from the first stage, to prevent aerosol droplets and aqueous solutions of deliquesced particulates, which include at least portions of the dust not removed by the first stage and which are re-released into the airflow from the first stage, from proceeding along the airflow and to remove solid particulates not removed by the first stage from the airflow; and a third water removal stage, disposed downstream from the second stage, to remove from the airflow aerosol droplets leaking from the second stage.

2. The system according to claim 1, wherein the first stage comprises a substantially cylindrical filter that removes the dust, the snow and ice from the airflow with a pulse of compressed air.

3. The system according to claim 1, wherein a pulse of compressed air is directed to blow ice off of the first stage.

4. The system according to claim 1, wherein the second stage comprises a water tight filter mounted in the inlet at an oblique angle with respect to a direction of the airflow.

5. The system according to claim 4, wherein the water tight filter comprises fiberglass.

6. The system according to claim 4, wherein the water tight filter comprises a hydrophobic coating which removes water and allows for air passage therethrough.

7. The system according to claim 1, wherein the third water removal stage comprises a downstream vane separator to remove aerosol droplets having diameters greater than 20 microns from the airflow.

8. The system according to claim 1, further comprising a weather hood disposed upstream from the first stage to provide for protection from rain.

9. The system according to claim 1, further comprising an anti-icing system interposed between the first and the second stages to prevent ice formation at the second and third stages.

10. The system according to claim 9, wherein the anti-icing system comprises any one or more of a hot water coil, a steam coil or hot compressed air.

11. The system according to claim 1, wherein at least the first through the third stages provide noise attenuation for the gas turbine.

12. The system according to claim 1, further comprising a drainage system disposed within a clean air side of the inlet to prevent an air bypass therethrough.

13. A method of filtering airflow of inlet air in an inlet housing of a gas turbine, the method comprising:

removing dust, snow and ice from the airflow at a first stage of the inlet;

at a second water tight stage, disposed downstream from the first stage, preventing aerosol droplets and aqueous solutions of deliquesced particulates, which include at least portions of the dust not removed by the first stage and which are re-released into the airflow from the first stage, from proceeding along the airflow and removing solid particulates not removed by the first stage from the airflow; and at a third water removal stage, disposed downstream from the second stage, removing from the airflow aerosol droplets leaking from the second stage.

14. The method according to claim 13, wherein the removing of the dust, snow and ice comprises emitting a pulse of compressed air that directs the dust, snow and ice out of the airflow at the first stage.

15. The method according to claim 13, further comprising angling a weather hood upstream from the first stage to provide for protection from rain.

16. The method according to claim 13, further comprising preventing ice formation at the second and third second stages by an anti-icing system interposed between the first and second stages.

* * * * *